July 29, 1958
J. O. WELDON
2,845,529
PROTECTIVE CIRCUITS
Filed April 6, 1953
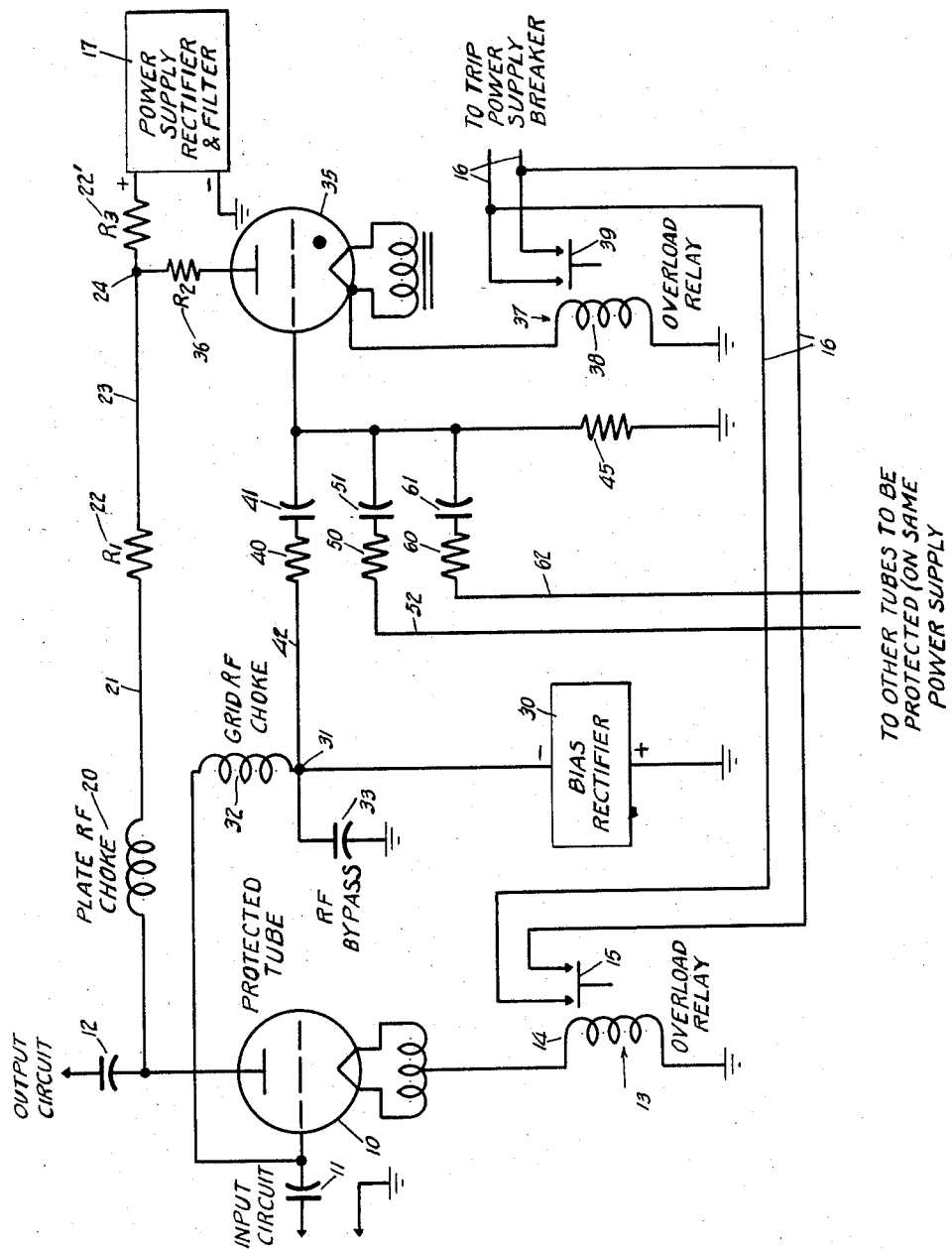
INVENTOR.
James O. Weldon
BY
Moses, Nolte, Crews & Berry
ATTORNEYS United States Patent Office 2,845,529
Patented July 29, 1958

2,845,529

PROTECTIVE CIRCUITS

James O. Weldon, Dallas, Tex.

Application April 6, 1953, Serial No. 346,982

5 Claims. (Cl. 250—27)

The present invention relates to a method of protecting electrical devices, and to a circuit to carry out the method, by removing power from the protected device upon arcing between electrodes thereof; and more particularly to a method and circuit to protect high voltage electron tubes from interelectrode arcing.

The problem of interelectrode arcing in vacuum tubes has been recognized, and various protective circuits have been proposed. It has been suggested to short circuit the power supply by means of mercury vapor tubes, such as ignitrons, at the load side of the power source, thereby removing the power from the protected device and preventing the discharge of filter condensers (which may be incorporated in the power supply) through the protected tube. Such a protective system must be capable to carry a high current, at least initially while power filter condensers may still be discharging, yet have a very high resistance (preferably infinite) when not in operation. Further, the action of the protective system must be almost instantaneous, because even so short a time as 50 micro-seconds may be sufficient to severely damage a vacuum tube during arcing.

It is accordingly an object of the invention to provide a method, and a circuit to carry out the method, which will be almost instantaneous in operation, yet have sufficient current carrying capacity.

It is another object of the invention to provide a circuit which will be sensitive only to arcing or faults within the protected device, but insensitive to normal changes in operating conditions within the protected circuit.

It is still another object to provide a protective circuit arrangement which will be capable of protecting a plurality of electrical devices operating from the same power supply.

It is yet another object to provide a protective circuit which is simple and has few component parts, thereby decreasing the possibility of faults within the protective circuit itself.

According to the present invention, I provide a method of protecting electrical devices, such as vacuum tubes, which have electrodes connected across a source of high potential, by means of an electron gas discharge tube, such as a hydrogen gas thyratron, in which a control potential to fire the thyratron is obtained directly from one of the electrodes subject to arcing (of the protected device). This potential is utilized to fire the gas discharge tube. The gas discharge tube is connected across the source of high potential, substantially in parallel with the protected device, and will short circuit the source of potential, thereby removing the power from the protected device and interrupting the arc. Under normal conditions the gas discharge tube, i. e. the thyratron, will be non conductive. However, under arcing conditions within the protected device, the rise in potential of the electrode which is struck by the arc from the high-voltage electrode of the protected device is utilized to cause a corresponding rise at the grid of the gas discharge tube, which will fire, and suppress the arc in a known manner.

In a preferred embodiment of the invention I employ a hydrogen gas thyratron, due to its stability of ignition voltage under varying temperature conditions, and due to its ability to carry heavy surge currents. The invention is not limited to the hydrogen gas thyratron, however, since the method and circuit may be used with any type of control grid type gas filled tube.

According to an important feature of the invention, I provide a circuit which includes a connection from an electrode of the protected device to the anode of the gas filled tube, and thence to the high potential terminal of a source of high voltage. Similar connections (which may be made through "ground") connect the other terminal of the protected device, the cathode of the gas filled tube, and the other terminal of the high voltage source. A control connection is then provided from one of the electrodes subject to arcing to the grid of the gas filled tube. Preferably, this control connection includes a blocking condenser to prevent a D.-C. component from reaching the grid. I also prefer to include resistances in the anode-cathode circuit of the thyratron to limit the current flowing therethrough. These resistances may be inserted in series with the load-terminal of the high voltage source, or interposed in the connection between the high-voltage electrode and the connection to the anode of the thyratron.

A preferred circuit according to the invention is shown in the accompanying drawing. 10 is the electrical device to be protected, here shown as a triode transmitter tube, and connected through condensers 11 and 12 in a conventional manner to its associated R-F circuit. A coil 14 of an overload relay 13 is connected in the ground lead of the plate-cathode circuit, to control a circuit 16 of a power supply breaker (not shown) through contacts 15, to open the connection to a power supply 17 in case of excessive plate current.

Power supply 17 may be of the rectifier and filter type. It is connected to the plate of tube 10 by means of choke 20, connection 21, resistor 22, line 23, and junction 24. The resistor may also be placed as shown in dashed lines at 22', as will be more fully explained below. The other side of plate power supply 17 is grounded, the plate circuit being completed to the cathode of tube 10 through ground as shown.

Negative grid bias for tube 10 is supplied by means of rectifier 30. The positive side of the rectifier 30 is connected to ground in conventional manner; the negative side is connected to junction 31, and through grid choke 32 to the grid of tube 10. The bias rectifier is by-passed by condenser 33 as usual.

A thyratron type tube, i. e. a control grid type gas filled tube 35 has its plate-cathode circuit connected across the power supply 17, in order to short circuit the power supply in case of arcing within tube 10. The thyratron is preferably a hydrogen gas thyratron, or an argon gas thyratron, or any non-metallic gas thyratron. A resistor 36 connects the plate of thyratron 35 to junction 24, and thence a direct connection (or resistor 22' as mentioned above) completes the circuit to the high voltage terminal of the power supply 17. The cathode of the thyratron is connected to ground through coil 38 of overload relay 37. The contacts 39 of relay 37 control the same breaker circuit 16 as the contacts 15 of relay 13, to open the main line to the power supply 17 in case of current flowing through the anode-cathode circuit of the thyratron 35.

The control grid of thyratron 35 is connected through a resistor-condenser network 40, 41 and a lead 42 to junction 31, and thence through choke 32 to the grid of tube 10. A conventional grid resistor 45 is provided for thyratron 35.

The thyratron 35 may be used to protect a number of tubes similar to tube 10 and operated from the same power supply 17. Connections to other such tubes may be made in a similar manner, two such connections being shown at 50, 51, 52, and 60, 61, 62, which connections are generally similar to those shown at 40, 41, and 42.

The operation of the device is as follows: if an arc occurs within tube 10, for example from the plate to the grid, the potential of the grid will rise immediately to a high value; this potential is applied through choke 32, junction 31, lead 42, resistor 40, and condenser 41 as a surge to the grid of the thyratron, which will fire, and provide a low resistance path across the power supply 17, thereby practically short circuiting the power supply, including its associated filter condensers. As an added protection, the overload relay 37 in the cathode circuit of the thyratron will operate to trip the main circuit breakers of power supply 17 to disconnect the same from the main power line. The relay 37 will operate rapidly, due to the heavy current initially flowing through thyratron 35. The removal of power from the power supply, however, is of secondary importance as far as protection against arcing within tube 10 is concerned. Tube 10 already has been relieved of plate voltage by the short circuiting action of the thyratron. In case of plate-grid arcs within tube 10, the relay 13 would not give effective protection, since its action depends entirely on the current flowing through the cathode, and this current may not be large enough to cause rapid operation of relay 13.

Resistor 22 is similar to the current limiting resistors usually employed in the plate circuit to protect the tube 10 from interelectrode arcs. It may be in the order of 30 ohms. The resistor 36, in the plate circuit of thyratron 35, is used to limit the current through the thyratron. Its value may be so chosen that with the given plate voltage, the current through the thyratron is not appreciably in excess of 750 amperes. Limiting the current through thyratron 35 to such a value provides ample protection for the protected tube without damage to the thyratron itself.

Better protection for tube 10 may be obtained by moving resistor 22 to the position shown in dashed lines, at 22'. The operation during normal conditions is somewhat improved, due to the fact that the value of the resistance may then be decreased to about 7 ohms, thereby providing for better regulation. Moving the resistor 22 to the position shown at 22' will result in a voltage divider affect by resistors 22' and 36, which will reduce the voltage on tube 10 during arcing even further as soon as the thyratron 35 has fired. However, care has to be taken to prevent undesirable feedback or coupling from one stage to another when several stages of an amplifier are operated from the same power unit and are protected by the same thyratron. A by-pass condenser of such value that its capacity is sufficient to by-pass frequencies at or near the operating frequency of the tube 10 may be used to avoid interstage coupling. The capacity of such a condenser would be sufficiently small so that no damage would be caused by its discharge through tube 10 in case of a fault within the tube.

The bias supply 30 must have some internal impedance so that a potential difference will result between junction 31 and ground in case an arc from the plate of tube 10 strikes the grid of the tube, causing a current to flow through the grid, and the bias supply, to ground. While the operation of the present protective circuit does not depend on the development of a voltage due to such fault current (as was generally the case in circuits of the prior art), some means must be provided to prevent the grid potential from reaching zero (or ground) potential. In case of an ordinary bias rectifier as now commercially used, the filter of the output provides sufficient surge impedance so that the voltage on the grid, when the arc strikes, will be sufficiently positive to result in a voltage build-up sufficient to fire the thyratron. Placing a small resistance in series with the filter network of the bias rectifier, or in series with a by-pass condenser thereof, is usually sufficient. It has been found that a 2 ohm resistance was adequate for the purpose. Alternatively, the addition of an inductance between the negative terminal of the bias supply 30 and junction 31 may provide sufficient impedance to prevent the voltage at the grid from dropping to zero, which would prevent firing of the thyratron because normally the grid of the thyratron tube 35 is maintained at cathode (i. e. zero) potential through resistance 45.

The filament and cathode circuits of the tubes illustrated have not been further described, since they are conventional and well known in the art. Conventional by-passing elements, such as for example audio by-pass condensers across the bias rectifier 30 also have not been further shown or described. The values of the limiting resistors 22, 22', and 36 will depend on the plate voltage and permissible current carrying capacities of the tubes, particularly the upper safe limit of current through tube 35. The inductance of the grid choke 32 may be made very small, particularly in a high power transmitter. The values of resistances 40, 50, 60, etc. will also depend on the safe limits of tube 35, since they are used to limit the voltage appearing at the grid of tube 35; and capacitors 41, 51, 61, etc. isolate the bias potential from the thyratron grid and need be only large enough to provide for a rapid build-up of voltage on the grid of thyratron tube 35.

From the foregoing it can be seen that an extremely simple protective circuit is provided which is activated directly by the arc within the protected tube itself, and without any intermediate auxiliary vacuum tube networks, in that a control connection is made which directly connects the grid of the protected vacuum tube with the grid of the short circuiting thyratron.

While the invention has been illustrated and described as embodied in a control circuit for vacuum tubes, it is not intended to be limited to the details shown, since various modifications and changes may be made. The invention may be adapted to the protection of various electrical devices subject to arcing or flashover, and such adaptations are intended to be comprehended within the scope of the appended claims.

What is claimed is:

1. A protective circuit for an electron tube device comprising a power supply connected across the device and means for substantially short-circuiting the power supply in response to arcing between an anode and a grid of the protected device, said short-circuiting means comprising a grid controlled gas filled tube having an anode, a control grid, and a cathode; connection means from the anode of the protected device to the anode of the gas filled tube; return connection means from the cathode of the gas filled tube to the power supply, the gas filled tube being substantially directly connected across the power supply; a circuit between the control grid and cathode of said protected device including a source of biasing voltage and a control connection from the grid of the gas filled tube to a point in said circuit such that there is inappreciable resistance in a path from said point to the grid of said protected tube.

2. A circuit as claimed in claim 1, wherein the grid controlled gas filled tube is a hydrogen thyratron.

3. A circuit according to claim 1, including a relay in the anode-cathode circuit of the gas filled tube, and connections from said relay to the power supply operative to interrupt the flow of power upon operation of the relay.

4. A circuit as claimed in claim 1 to protect a plurality of additional electrical devices connected to the same power supply each having an electrode to which an arc discharge may occur, including a plurality of additional control connections, each such connection being connected to one of said electrodes of the additional devices and all said control connections being electrically connected together at the grid of the gas filled tube.

5. A protective circuit for electron tubes including means to remove a plate power supply from a protected tube upon interelectrode arcing between the plate and grid of the protected tube, said means comprising a nonmetallic gas thyratron having an anode, a cathode, and a control grid; first connection means from the plate of the protected tube to the anode of the thyratron; return connection means from the cathode of the thyratron to ground, the gas filled tube being connected across the power supply so as to substantially short circuit the power supply when a gas discharge occurs in said gas tube; a circuit connecting the grid and cathode of the protected tube and a control connection from the grid of the thyrathron to a point in the grid-cathode circuit of the protected tube which is electrically closer to the grid of the protected tube than to any other electrode of the protected tube.

References Cited in the file of this patent

UNITED STATES PATENTS

| | | |
|---|---|---|
| 2,083,202 | Schlesinger | June 8, 1937 |
| 2,129,088 | George | Sept. 6, 1938 |
| 2,502,443 | Dunn | Apr. 4, 1950 |
| 2,514,863 | Hanchett | July 11, 1950 |
| 2,571,027 | Garner | Oct. 9, 1951 |
| 2,575,232 | Parker et al. | Nov. 13, 1951 |
| 2,611,809 | Lee | Sept. 23, 1952 |
| 2,615,147 | Hoover | Oct. 21, 1952 |